United States Patent [19]
Moustakas et al.

[11] Patent Number: 4,723,311
[45] Date of Patent: Feb. 2, 1988

[54] METHOD AND APPARATUS FOR RECOGNIZING DATA COLLISIONS IN AN OPTICAL DATA BUS

[75] Inventors: Steven Moustakas; Hans-Hermann Witte, both of Munich, Fed. Rep. of Germany

[73] Assignee: Siemens Aktiengesellschaft, Berlin and Munich, Fed. Rep. of Germany

[21] Appl. No.: 807,209

[22] Filed: Dec. 11, 1985

Related U.S. Application Data

[63] Continuation of Ser. No. 560,350, Dec. 12, 1983, abandoned.

[30] Foreign Application Priority Data

Dec. 14, 1982 [DE] Fed. Rep. of Germany ....... 3246301

[51] Int. Cl.$^4$ .............................................. H04B 9/00
[52] U.S. Cl. ...................................... 455/612; 370/85; 370/94; 455/607
[58] Field of Search ............... 455/601, 606, 607, 612; 370/4, 85, 94; 328/111, 112, 129.1

[56] References Cited

U.S. PATENT DOCUMENTS

| 3,634,869 | 1/1972 | Hsueh | 328/111 |
| 4,114,106 | 9/1978 | Martensson | 328/111 |
| 4,422,179 | 12/1983 | Albanese | 455/606 |
| 4,439,856 | 3/1984 | Ulug | 370/85 |
| 4,476,467 | 10/1984 | Terwilliger | 370/85 |
| 4,499,576 | 2/1985 | Fraser | 370/94 |
| 4,531,238 | 7/1985 | Rawson et al. | 455/601 |

FOREIGN PATENT DOCUMENTS 2111337  6/1983  United Kingdom ............... 455/601

Primary Examiner—Joseph A. Orsino, Jr.
Attorney, Agent, or Firm—Adel A. Ahmed

[57] ABSTRACT

In an asynchronously operating optical data bus:
(a) data collisions are detected via two analog comparators by amplitude evaluation if the input optical power fluctuations at the site of a receiver as a function of all transmitters do not exceed approximately 3 dB; or
(b) at first only one or more transmitting subscribers detect collisions and communicate this to other subscribers by one or more JAM signals; or
(c) each subscriber interrogates, during the time which corresponds to its bus turn-around time, whether in its receiver, data signals are arriving from the bus.

8 Claims, 5 Drawing Figures

METHOD AND APPARATUS FOR RECOGNIZING DATA COLLISIONS IN AN OPTICAL DATA BUS

CROSS-REFERENCE

This is a continuation of application Ser. No. 560,350 filed Dec. 12, 1983 now abandoned.

BACKGROUND OF THE INVENTION

The present invention relates to a method for detecting data collisions in an optical data bus.

Circuits which implement a method for the above purpose have been proposed in the older German patent application P No. 32 24 664.1 (VPA 82 P 1509). A U.S. patent application for the invention was filed on June 16, 1963, and was assigned Ser. No. 505,432. Its contents are herein incorporated by reference. The proposed methods for collision recognition are based on a level evaluation of the pulses arriving in a receiver or on a bit by bit comparison of the pulses sent and received.

SUMMARY OF THE INVENTION

It is an object of the present invention to provide additional advantageous methods for the detection of data collision in an optical bus.

It is a further object of the present invention to disclose circuit embodiments for the detection and recognition of data collisions.

According to a preferred embodiment of the invention collisions are detected directly by all subscribers to the optical bus via two analog comparators. Through the analog comparators an amplitude evaluation is effected for the determination of the superposition of two or more data sequences simultaneously on the optical data bus. The present implementation is particularly effective if received optical power fluctuations at the site of any receivers which are present in the various subscribers to the bus do not exceed 3dB. According to the present embodiment JAM signals are not generated to indicate to others subscribers the occurrence of a data collision.

In accordance with the a further embodiment of the invention, to begin with one or more transmitting subscribers detect collisions. According to the present embodiment power fluctuations at the site of any receiver do not limit the functionality of the circuit. A collision which is detectable in a transmitting subscriber is communicated to all other subscribers by a JAM signal. The JAM signal comprises a bit pattern which is unique and different from the typical data signals.

A still further preferred embodiment of the present invention discloses a method for detecting collisions in which, during the time which corresponds to the loop-time or turn-around time of the system bus, each subscriber interrogates whether its receiver is receiving data signals from the data bus. This method is referred to as "collision recognition operating in accordance with the monitoring principle".

According to the first embodiment above in which comparators are used, collisions are recognized directly by all subscribers. This comprises an especially simple method. However, it is realizable only if the maximum received optical power difference at any one receiver does not exceed 3 dB.

According to the second embodiment above restriction as to power fluctuations is not important. However, collisions can be detected only by subscribers transmitting at a given time, which in turn then communicate this state i.e. that a collision has occured to all non-transmitting subscribers by the so-called JAM signal. This signal has a distinctive pattern which can be differentiated from the normal useful data bits.

The two methods above provide the basis for the realization of asynchronously operating optical data buses in which bus access, collision and interrupt requests can be recognized in all subscribers.

According to the third mentioned embodiment which operates according to the monitoring principle, a simple control circuit for the recognition of data collisions and bus access status in optical buses is available. The method may be used in particular in star buses with asynchronous access procedures which purposely does not impose power equidistribution requirements and in which the position of various subscribers along the data bus can be easily accounted for. Signal levels or signal powers according to this last mentioned method are less critical for the detection of data collision. Also, the last method may be implementated by a greatly simplified circuit and critical bottlenecks in a coupler associated with the typical circuitry are eliminated.

Other features and advantages of the invention will be apparent from the following description of the preferred embodiments, and from the claims.

For a full understanding of the present invention, reference should now be made to the following detailed description of the preferred embodiments of the invention and to the accompanying drawings.

DETAILED DESCRIPTION

Figure 1:
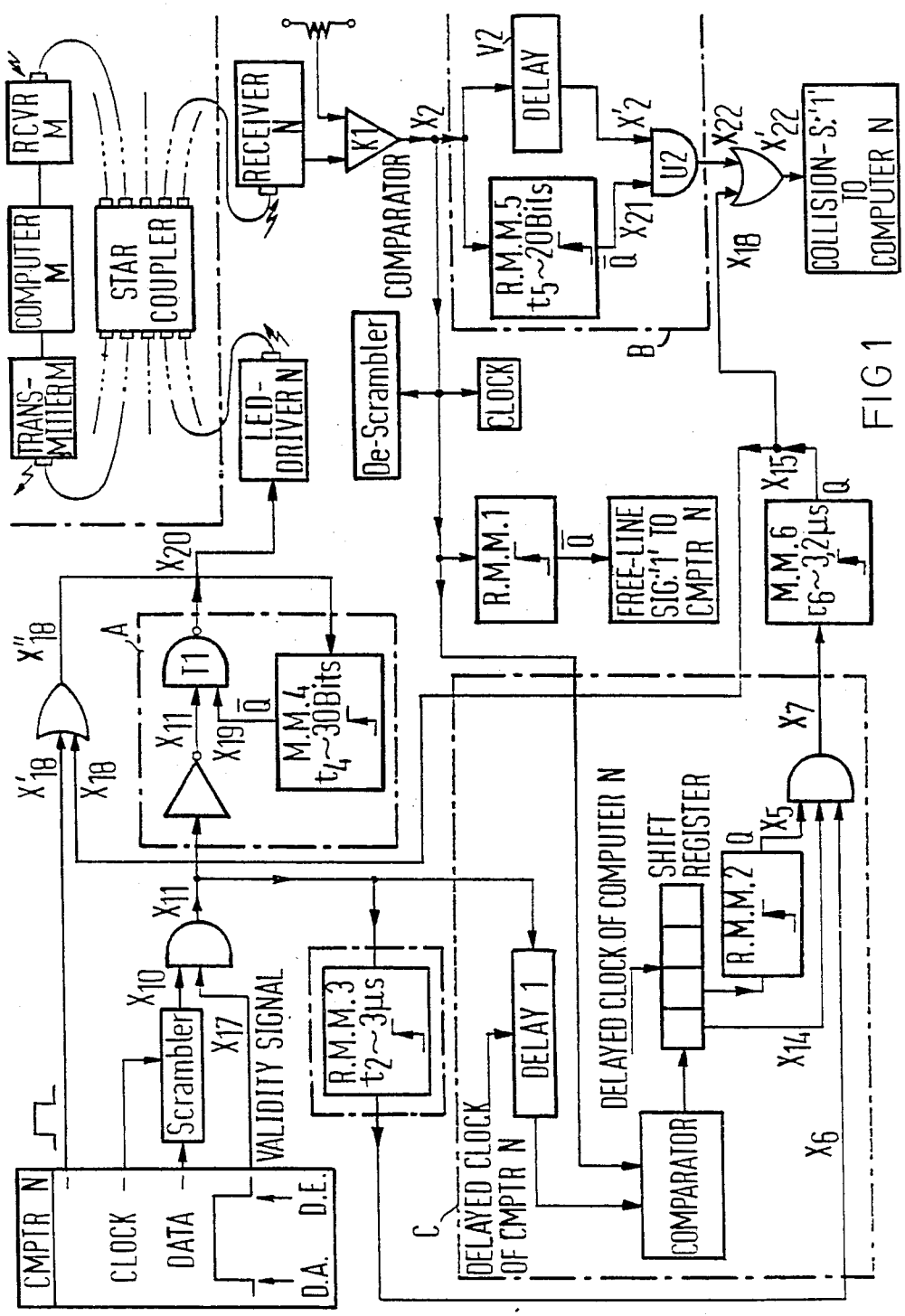
FIG. 1 shows a block diagram of a circuit for collision and free-line or data bus access recognition.

For the description which follows, the following applies:

The time constant $\tau_i$ (i=1 to 7) of the (retriggerable) monostable multivibrator i, designated as (R.) M.M.i. for short, corresponds to the time of the unstable state of the multivibrator.

The time constants given in numbers relates to a bus length of 600 meters. For a refractive index of a glass fiber core of 1.5, the transmit time of a pulse on a glass fiber length of 600 m is 3 us.

An interrupt request is represented by a short positive pulse.

The time between the start and end of useful data is enclosed in the time period during which the "validity" signal is in a logic "1" state.

The data rate of the system is 16 Mbit/s. The scrambler needed for scrambling the data signals is designed so that at its output not more than eight "1"s or "0"s appear in uninterrupted succession.

The state "Send no data" is represented by an uninterrupted succession of bits of the binary state "0" which is longer than eight bits.

JAM signals are triggered by interruption requests or collisions and comprise about 30 bits of binary state "1" in uninterrupted succession.

The circuit arrangements as described in the U.S. patent application referenced above are based upon the following assumptions:

(1) data start and end of the data supplied by the computer are indicated by pulses on separate lines;

(2) collisions need be recognized only in the transmitting subscriber; and (3) interrupt requests need to be recognized.

The bits of a transmitting subscriber are compared with the bits which arrive in the receiver of the same subscriber. A delay circuit is provided, such that each bit of the transmitter coincides in time with the bit coming from the same transmitter and which has returned to the receiver of the transmitting subscriber after passing through the bus length. In another circuit version, the delay element, which is to be matched in time, is replaced by an analog comparator which, together with another analog comparator always existing in the actual receiver loop, make it possible to detect collisions by evaluation of the amplitudes of the bit streams. A circuit for implementing the above has been disclosed in the aforementioned prior patent application (German patent application P No. 32 24 664.1).

In accordance with the present invention, the requirements for the collision and free-line circuit are made stricter essentially in three points. In this proposal the following three modified requirements have been taken into consideration.

1. The data start and end are to be indicated, not by two separate lines or "trigger pulses", but by one pulse, the duration of which comprises the data transmissions, i.e. the sending of the header and dummy bits plus actual or useful data. As has been mentioned before, this pulse is referred to as the "validity" signal.

2. Collisions are to be recognized in all computers, not—as before—in transmitting computers or subscribers only.

3. The system is to recognize interrupt requests.

As far as the second requirement is concerned, two implementations must be distinguished.

I. If the maximum received optical power fluctuations in any receiver does not exceed approximately 3 dB, preferably 2 dB, it is possible with the level evaluation proposed in the cited older patent application to recognize directly collisions not only in the transmitting but in all computers by way of two comparators. The thresholds in the threshold value comparators are selected so that when only one bit stream is present, only one comparator responds, and this indicates that there is no collision. But if at least two bit streams overlap, then the other comparator also responds, indicating a collision. A clear distinction between collision and no collision is possible with this principle only if the input power fluctuations at the receiver are not so great that the sum of the amplitudes (at the output of the amplifier) of two bit streams can become smaller than or equal to the amplitude of one other bit stream. This method does not require a JAM signal.

II. If the star coupler section of a bus does not fulfill the condition stipulated for power levels, collisions can be recognized only in the transmitting computers. The detection of a collision must be communicated to all computers via a JAM signal. A JAM signal must be a bit pattern which clearly differs from useful data and from the state "Send no data". Specialized circuitry is required for the generation and recognition of a JAM signal.

In the description below which pertains to an embodiment according to FIG. 1, it is assumed that a JAM signal is needed. It must be possible to produce and to recognize them. In the drawings certain functions are represented by logic block units. Thus, for example, needed power drivers, the logic function of which corresponds to an inverter, are represented partly by inverters.

FIG. 1 illustrates the interplay of the logic block units.

Free-line Recognition

The circuit for recognition of free line, i.e. of the state in which the bus is free of data signals, is the same as described in the previously mentioned patent application. The time constant $\tau_1$ of the retriggerable monostable multivibrator R.M.M.1 which generates the free-line signal is chosen to be about 5 us long in the case here described. It is thereby ruled out that long uninterrupted sequences of bits of binary state '1', as they occur, e.g. in a JAM signal, will generate a free-line signal. If, in fact, $\tau_1$ is not large enough, then for logic '1' sequences which are longer than $\tau_1$, the output $\overline{Q}$ of the multivibrator R.M.M.1 becomes '1', because in the '1' sequence a positive edge change or respectively a positive edge cannot take place or occur.

Recognition of Collisions in Transmitting Computers and Generation of a JAM Signal As has been explained in detail in the older patent application in a transmitting computer in case of a collision $x_7 =$ '1'. Owing to this, $x''_{18} = x_{18} =$ '1' ($x_{18}$ corresponds to output $x_{15}$ in FIG. 2 of the older patent application). Because of the monostable multivibrator M.M. 4 $x_{19}$ becomes '0'. If $x_7$ becomes '1', $x'_{22} =$ '1'. This collision signal $x'_{22}$ switches $x_{17}$ to '0', so that $x'_{11}$ becomes '1', and a logic '1' remains (a measure taken in the computer). As long as $x_{19} =$ '0' ($\tau_4$), the LED sends a logic '1'. This JAM signal is selected about 30 bits long. Thereafter $x_{19} = x'_{11} =$ '1' and the LED sends only a '0'. The time constant $\tau_6$ is chosen to be a little (100 ns . . . 200 ns) greater than the time constant $\tau_3$. This is because, when the JAM signal generated by a collision recognition comes back to the place of the origin after running through the bus length, it is to be prevented that a JAM signal is again produced. The returning JAM signal may, however, produce a collision ($x_7 =$ '1'). As long as $x_7 =$ '1', $x_{18}$ must remain on '1' through a corresponding time constant $\tau_6$ in order that $x_{19}$ will not again go to '0' and trigger a new JAM signal.

Interrupt Treatment

Upon occurence of an interrupt pulse (a computer wants to inteDrrupt the existing state and possibly transmit itself), $x''_{18}$ becomes '1' and $x_{20}$ becomes '1' for the time which corresponds to the time constant $\tau_4$, i.e. the LED produces a JAM signal. Simultaneously with the interrupt pulse, $x_{17}$ is switched to '0' (and remains '0'). After the JAM signal the LED (light-emitting-diode) is turned off.

Recognition of the JAM Signal

The circuit for recognition of the JAM signal corresponds, roughly, to a counter which recognizes that for instance more than 30 bits of binary state '1' have come out of the comparator K1 of the receiver in a continuous uninterrupted sequence. This state is uniquely correlated with the JAM signal. The time constant of the retriggerable monostable multivibrator R.M.M.5 of the JAM signal recognition circuit is chosen more than twice the time required for the longest uninterrupted flow of '1' from the scrambler. Let it be assumed, for example, that not more than eight '1's, or '0's can be generated by the scrambler in uninterrupted succession. The time constant $\tau_5$ of the multivibrator R.M.M.5 is then chosen for example to be 20 bits long. During "Data transmission" within this time a positive edge change then always occurs, so that data output Q remains '0'. Now if a JAM signal occurs, for instance for a sequence of 30 bits of '1's, Q will remain '0' for a period of at most 20 bits and then change over to a '1' state. If a '1' of a data sequence gets into the multivibrator R.M.M.5, the '0' edge output at P, which is triggered by the positive edge of this '1' appears delayed by about 15 ns. Then for this time of 15 nx, $x_{21}$ would be $x'_{21} = x_{21} = $ '1'. This data would be incorrectly recognized as a JAM signal. However, if $x_2$ is delayed by at least 15 ns, the incoming data sequence is not interpreted as a collision. Now if a JAM signal of e.g. 30 successive '1' actually occurs, Q will remain '0' for a period of at most 20 bits and then becomes a '1'. Together with $x'_2 = $ '1' $x'_{22}$ becomes '1', and therefore the JAM signal is recognized in the form of the collision signal '1'.

Collision Recognition in Non-transmitting Computers

In the circuit illustrated in FIG. 1, non-transmitting computers can recognize collisions only through JAM signals which originate from transmitting computers in which collisions have been recognized.

It is to be stressed once more than in the example set forth in detail according to FIG. 1 a JAM signal must be produced and recognized, because collisions are detected only in transmitting computers. Further it is assumed in the circuit according to FIG. 1 that recognition of the collisions in transmitting computers occurs by a bit-by-bit comparison of their own data. Detection of collisions in transmitting computers is possible also by two comparators, as represented in the mentioned older patent application. Lastly, in the simplest case, collisions can be recognized in all computers directly, i.e. without JAM signals, if the maximum optical input power fluctuation at any receiver as a function of all transmitters does not exceed approximately 2 dB. This is carried out again with the aid of two comparators. In this case the line $x_6$ and the retriggerable monostable multivibrator R.M.M.3 in FIG. 1 would become superfluous.

Figure 2:
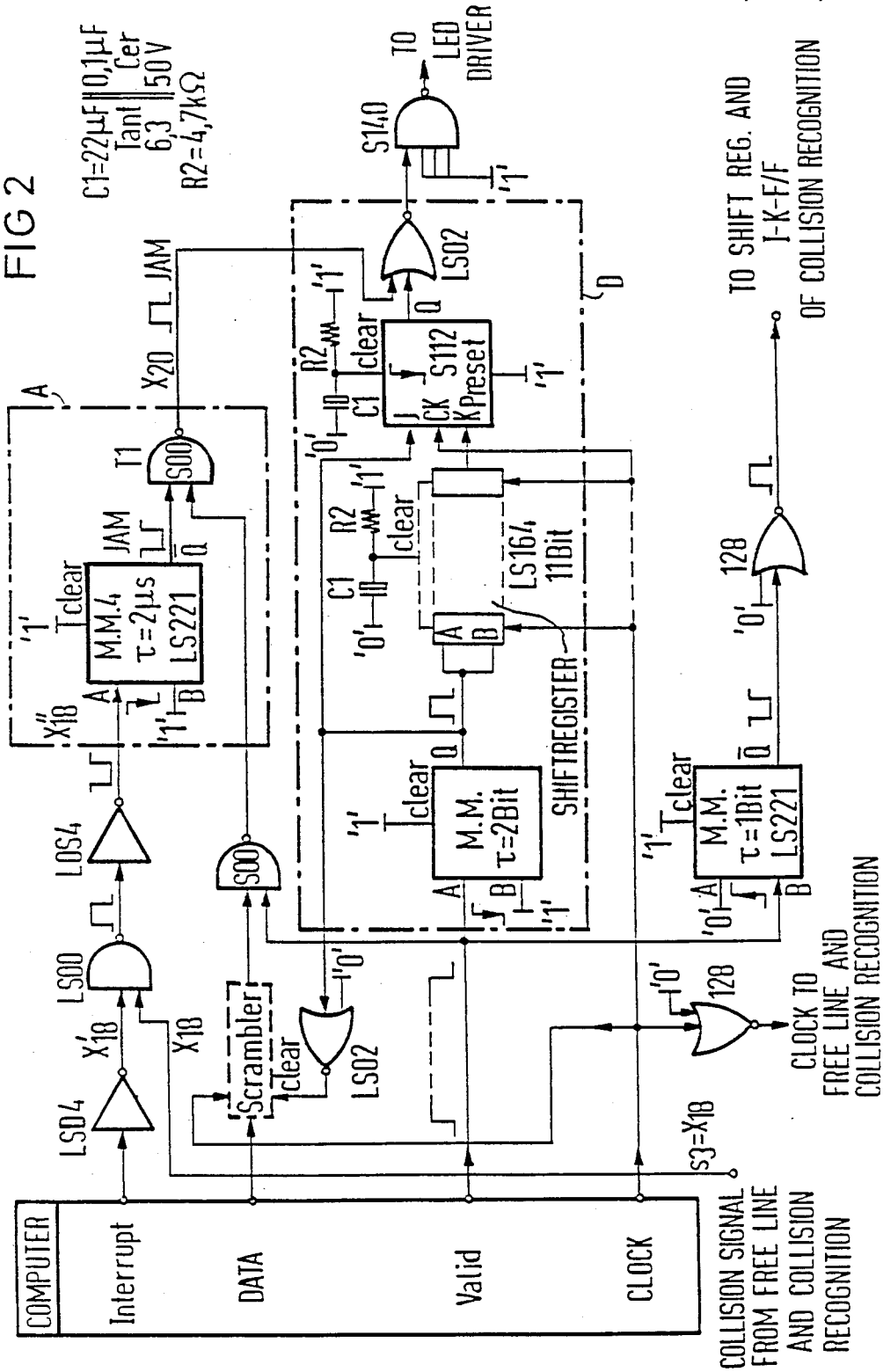
FIG. 2 shows a diagram or a circuit for a transmitter in the circuit according to FIG. 1.
Figure 3:
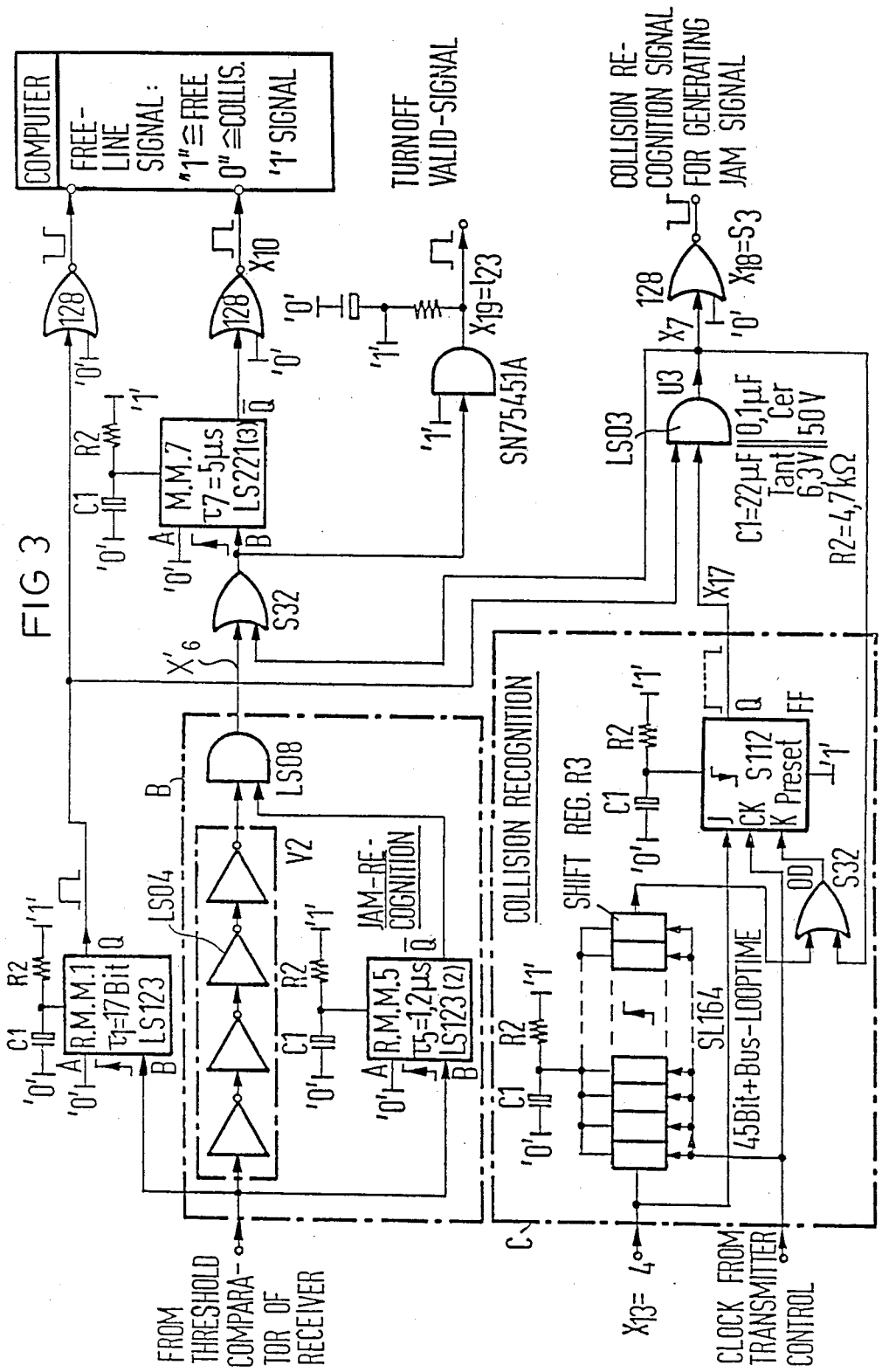
FIG. 3 shows a circuit for the recognition of the free-line or data bus access and of collisions, which is based on the last cited preferred method embodiment in the SUMMARY OF THE INVENTION section.
Figure 4:
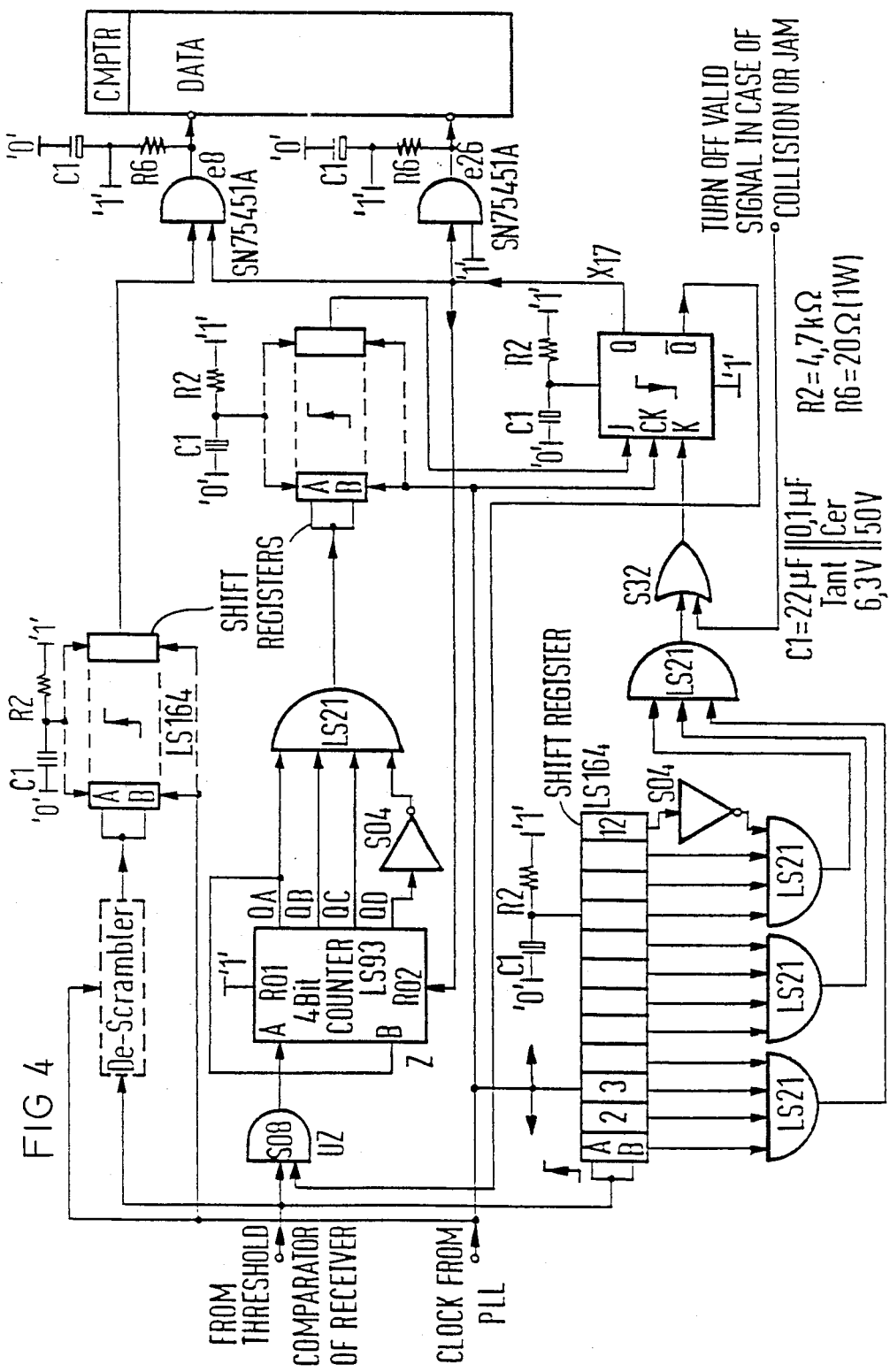
FIG. 4 shows a receiver control circuit.

In FIGS. 2 to 4, three control circuit units are indicated, which provide and show embodiments for the circuit corresponding to FIG. 1.

The three units consist of the transmitter control illustrated in FIG. 2, the free-line and collision recognition illustrated in FIG. 3, and of the receiver control illustrated in FIG. 4.

The transmitter control contains the unit A of FIG. 1. The transmitter control sends data in the form of data packets, each of which contains, in addition to the useful data, header bits and possibly also dummy bits as well as end-marking bits. The header bits and possibly also the dummy bits precede the useful data, while the end-marking bits mark the end of the useful data. The header bits, dummy bits and useful data, which appear during the time marked from the leading edge to the trailing edge of the validity signal, are sent by the transmitter control in scambled form.

From the scrambled data packet sent by the transmitter control the receiver control recovers the useful data. The same is true of the clock and the validity signal. In case of collision it switches the validity signal off.

The free-line and collision recognition contains also a collision recognition circuit. When this free-line and collision recognition circuit is used for the realization of the circuit according to FIG. 1, it also means therefore, that the collision recognition principle is changed, because the collision recognition circuit C in FIG. 1 is replaced by the differently operating collision recognition circuit C' according to FIG. 3.

Below there will be described only the collision recognition circuit C' and the circuit simplifications resulting therefrom in the "free-line and collision recognition circuit" according to FIG. 3.

For illustration purposes actual numbers are used. It is assumed again that the data rate on the bus is 16 Mbit/s and the distance between the subscribers is about 600 meters, that the scrambler does not permit an uninterrupted succession of more than eight '0's or '1's in the scrambled data packet, that header bits, always starting with a logic '1' at the beginning of a data packet, are 14 bits long, and that the end of a data packet during transfer via the bus consists of a '0' followed by eleven bits of logic state '1'. The data-end pattern is produced by the transmitter control according to FIG. 2, namely by unit D. In addition to the actual data, there are supplied by the computer the validity signal (Valid signal) and the clock, both of which must be recovered in the receiver control.

Figure 5:
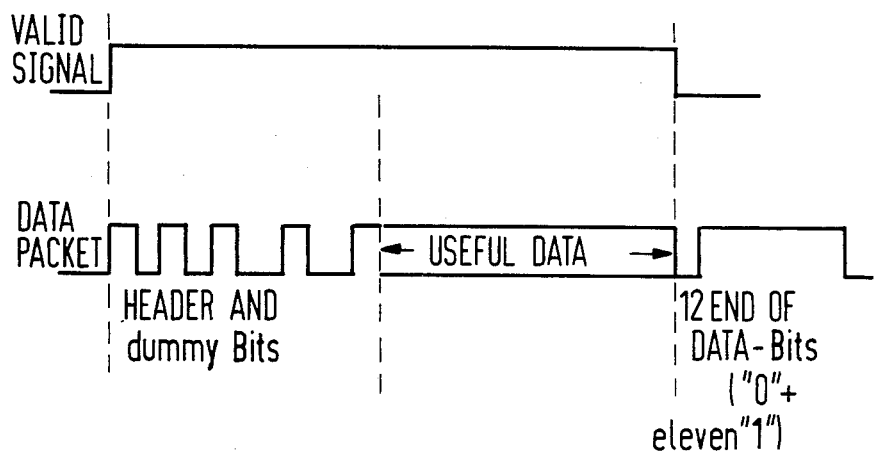
FIG. 5 illustrates schematically a bit pattern of a data packet in conjunction with a Valid signal.

The entire data packet sent by the LED, consists of header and dummy bits, actual data and the end-marking bits, and has the pattern appearing in FIG. 5. In it, the validity signal encompasses the pattern of the data packet. The validity signal itself is not transmitted.

The time constant $\tau_1$ of the retriggerable monostable multivibrator R.M.M.1 in FIG. 3 is chosen so that the free-line state is indicated six bits later, after the entire data packet has been received by all subscribers. A JAM signal consists of an uniterrupted flow of '1's, not less than 24 bits long, corresponding to a duration of at least 1.5 us. The four inverters from the delay V2 and accordingly take into consideration the delay through the retriggerable monostable multivibrator R.M.M.5, so that together with the time constant $\tau_5 = 1.2$ us it is assured that $x'_6$ can become '1' only during the JAM signal. From the JAM recognition signal or the collision recognition signal there is formed by the monostable multivibrator M.M.7 a signal $x_{10}$ suitable for the computer. Furthermore there is produced through the JAM recognition signal or through the collision recognition signal a signal $x_{19}$ which in the receiver control circuit according to FIG. 4 terminates the validity signal $e_{26}$ and the recovered data flow to the computer $e_8$, opens AND gate $U_z$ preceding the counter Z again, and resets the counter Z to '0', ready for counting.

Collision Recognition

When a subscriber starts to transmit, a 1-bit pulse is generated in the transmission control by the positive edge of the validity signal. This causes $x_{17}$ in the J-K flip-flop FF in FIG. 3 to become '1' and the AND gate $U_3$ to be opened. While the AND gate $U_3$ is open, the transmitting subscriber can interrogate the bus via the retriggerable monostable multivibrator R.M.M.1 as to whether or not pulses are coming in. This monitoring time is chosen shorter than, but a equal as possible to the turn-around loop time corresponding to this subscriber. If during this time a signal is received, it must originate from another subscriber, that is, a collision has taken place. At $x_7$ a positive pulse is generated. In addition to the effects due to a JAM recognition, pulse $x_7 = $ '1' brings about that in the transmitter control a JAM signal is produced via $x_{18}$. By appropriate selection of the time constant $\tau_7$ in the monostable multivibrator M.M.7 a retriggering due to the JAM signal produced by the subscriber recognizing the collison is avoided.

$x_{17}$ become '1' at the start of the validity signal. $x_{17}$ becomes '0' if during the bus loop time a collision signal is recognized, or at the latest after the bus loop time. The delay of the shift register $R_3$ in FIG. 3 corresponds to the bus turn-around or loop time.

By the OR gate OD at the K input of the J-K flip-flop FF in FIG. 3 it is ensured that not more than one collision signal is produced during the bus turn-around time.

The new collision recognition circuit is simple, entirely uncritical and reliable. It does not require synchronization of the bits and sets practically no requirements for the power fluctuations.

As the first bit of data packet is always a '1', each subscriber needs to monitor the bus for incoming bits only for the time of one bus loop, without loss of efficiency in collision detection. Also a subscriber should monitor at most for the time duration of one turn-around, because thereafter the subscriber receives back its own data.

In the procedure according to the monitoring principle each transmitting subscriber listens to the bus, from the instant of the start of its data, which coincides with the beginning of the Valid signal. But for practical and logical reasons the monitoring time will always turn out shorter than the respective bus turn-around time. This means that there is a dead time during which there is no monitoring and therefore collisions cannot be recognized. For certain applications the probability of non-recognition of collision during the dead time may become too high.

To be able to recognize collisions also during the dead time, the procedure preferably is to detect collisions during this dead time through auxiliary hardware.

Especially suitable for this purpose is the method operating according to the principle of "collision recognition on the principle of level evaluation with JAM signal generation", because this method sets practically no requirements for the dynamic level or power fluctuations at the site of a receiver.

To be able to detect a collision during the dead time with certainty, one selects the dead time either shorter than the duration of one bit or equal to one bit, and makes sure that the data packets, specifically the header bits of the data packets, begin with two consecutive bits of binary state '1'.

It is thereby assured that in case of superposition of two bit streams that a sufficient level of signal will always occur, to which a comparator indicating a collision can respond. This means also, however, that the dead time must not be made too short relative to the length of one bit. It must be long enough for said threshold value comparator to respond.

In star networks, where the distances of various subscribers from the coupler are generally different, the monitoring times of the subscribers are correspondingly different. In any event, at least one subscriber will detect a collision and produce the respective JAM signal if the interrogation time is identical with the bus turn-around time. In this instance it is no longer necessary to distinguish between transmission faults and collisions.

In a ring bus, all collisions are recognized if one selected the monitoring time between one half and a full turn-around or loop time.

The circuits shown in FIGS. 2, 3 and 4 can be constructed with components of Texas Instruments as documented for example in "The TTL Data Book", Texas Instruments, fourth European Edition 1980. The designations LS 221, LS 123, S 112, LS 164, LS 21, LS 08, S 08, S 32, LS 04, S 04, LS 00, LS 02, LS 3 given in the FIGS. signify the designations of the components in the data book.

There has thus been shown and described a novel apparatus and method for detecting data collisions in a bus which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for recognizing data collisions in an asynchronously operating optical data bus to which several subscriber stations with transmitters and receivers are connected, said method for a particular subscriber station comprising the steps of:

(a) monitoring the optical data bus for the reception of data for a time period which is directly related to the position of the subscriber station along said optical data bus and is shorter than a bus turn-around time for receiving a data signal transmitted by the particular subscriber station on the optical data bus; and (b) detecting the receipt of data, the reception of data before the completion of the bus turnaround time indicating a data collision, wherein the beginning and end of a data transmission is determined by a validity signal, the length of which corresponds approximately to the duration of the data transmission, and wherein the particular subscriber, beginning with the start of the validity signal, interrogates the bus for a period of time (monitoring time) equal to a time shorter than but as equal as possible to each said transmitting subscriber stations' corresponding bus turnaround time, as to whether data signals are arriving at each said transmitting subscriber station's corresponding receiver, whereby a collision recognition signal is produced by a transmitting subscriber station only when data signals arrive at the corresponding receiver of said transmitting subscriber station during the corresponding monitoring time of said subscriber station, and that during a dead time determined by the difference between the turnaround time and the monitoring time, during which there is no monitoring, collisions are detected additionally by another collision recognition method operating on a different principle.

2. Method according to claim 1, wherein the other collision recognition method operating on a different principle operates on the principle of "collision recognition on the principle of signal level evaluation with unique JAM signal generation".

3. Method according to claim 2, wherein the length of the dead time is chosen either shorter than or equal to the length of one bit, and the first two bits forming the start of a data transmission are chosen to be equal to the binary '1' state thereby ensuring the detection of a collision during the dead time with certainty.

4. A circuit arrangement in a subscriber station of a packet data network for generating an output JAM signal responsive to the detection of a data collision comprising: a monostable multivibrator which can be brought into an unstable state by a collision recognition signal or an interrupt signal provided to a gating means at the input of said monostable multivibrator, and whose time constant ($\tau_4$) is chosen equal to the length of the JAM signal to be produced; a further gate with two inputs, one of which is energized either with an output signal ($\overline{Q}$) of said monostable multivibrator, being the inverse of the generated JAM signal output or the generated JAM signal output and the other input with a scrambled data signal output of a transmitter of the subscriber station, said gate for providing the generated output JAM signal to a transmitter (LED) of the subscriber station only after the said monostable multivibrator has been triggered at the input gating means by either the data collision recognition signal or the interrupt signal.

5. A circuit arrangement for a subscriber station of a packet data network for recognition of a JAM signal comprising: a retriggerable monostable multivibrator which is triggered by data signals provided by a receiver circuit of the subscriber station, the receiver circuit receiving particularly scrambled data signals and providing output data signals, said multivibrator having a time constant ($\tau_5$) which is chosen longer than the longest possible uninterrupted succession of bits of one binary state in the output data signals provided by the receiver circuit but shorter than the length of a JAM signal; a delay circuit connected in parallel with the retriggerable monostable multivibrator which delays the output data signals provided by the receiver circuit of the subscriber station by a time which corresponds to the signal transit time through said multivibrator; and and AND gate ($U_2$) with two inputs, one of which is energized by an output signal (Q) from said multivibrator and the other by the output signals of said delay circuit, the AND gate output being a collision recognition signal.

6. The circuit arrangement according to claim 5, further comprising means, connected to the output of the circuit arrangement and a collision recognition means, for preventing the occurrence of more than one collision recognition signal during a bus turnaround time.

7. A circuit arrangement in a subscriber station of a packet data network for collision recognition and for the generation of a collision recognition signal by interrogation of signals received from a data bus during a bus turnaround time, comprising:
  (a) a bistable multivibrator (FF);
  (b) a signal delay device ($R_3$); and
  (c) a gate ($U_3$) controlled by said bistable multivibrator (FF), the bistable multivibrator (FF) being, upon appearance of the leading edge of a pulse corresponding to the leading edge of a validity signal, brought into a state which opens the gate ($U_3$) for a free-bus line recognition signal also provided to the gate, the bistable multivibrator (FF) being brought by the leading edge of said pulse delayed by a bus turnaround time in the signal delay device ($R_3$) into a state which closes the gate ($U_3$) again, the collision recognition signal being available at the output of the gate ($U_3$).

8. The circuit system according to claim 7, wherein said signal delay device comprises a shift register.

* * * * *